C. H. SHARP & P. S. MILLAR.
PHOTOMETER ATTACHMENT.
APPLICATION FILED FEB. 24, 1910.
1,015,515.
Patented Jan. 23, 1912.
4 SHEETS—SHEET 1.
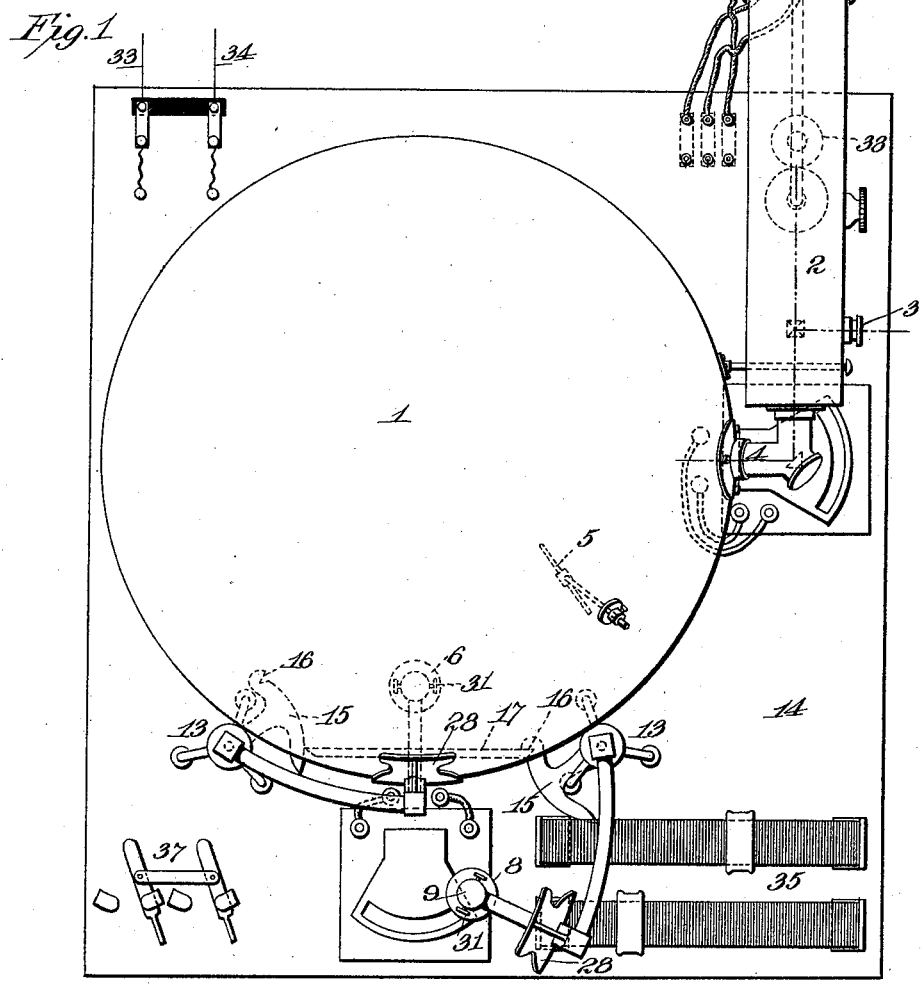
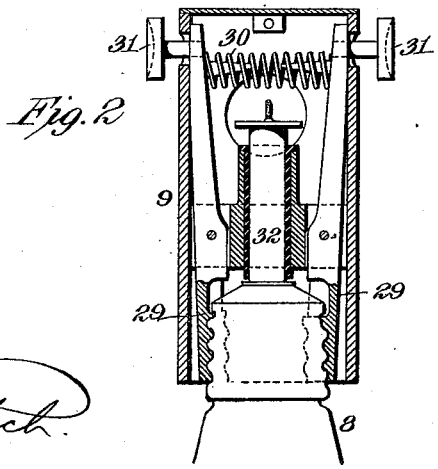
Witnesses:
Jas. F. Coleman
John Botsch
Inventors
Clayton H. Sharp
Preston S. Millar
by D. Myer Taylor
Attorneys.

C. H. SHARP & P. S. MILLAR.
PHOTOMETER ATTACHMENT.
APPLICATION FILED FEB. 24, 1910.
1,015,515.
Patented Jan. 23, 1912.
4 SHEETS—SHEET 2.
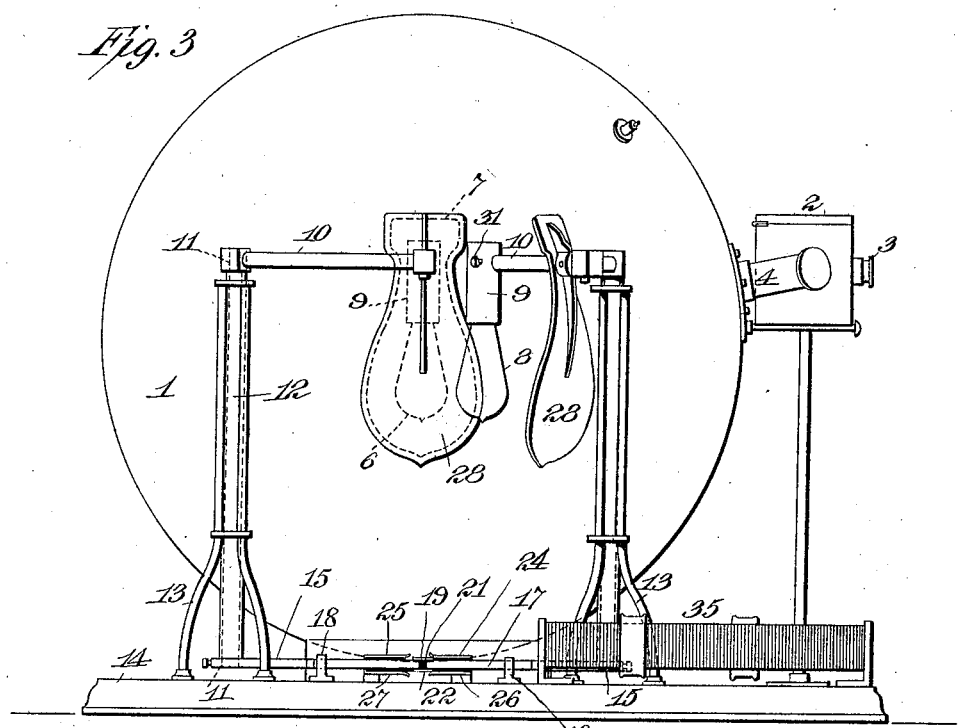
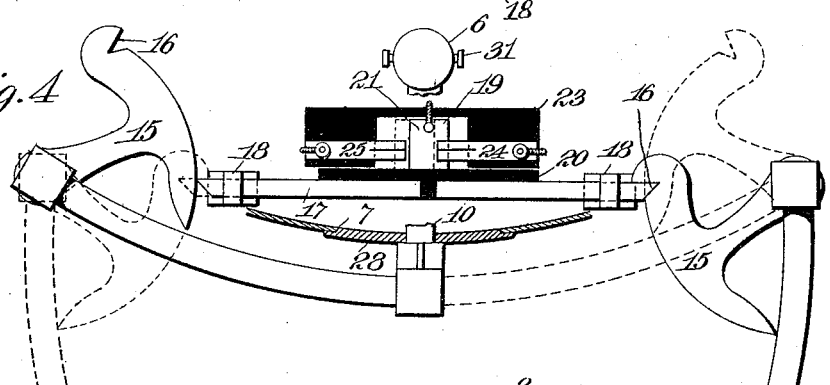
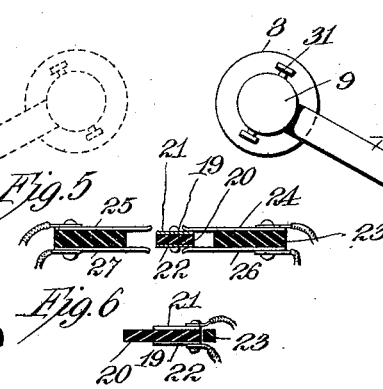
Witnesses:
Jas. F. Coleman
John Robch
Inventors
Clayton H Sharp
Preston S Millar
by their Attorneys C. H. SHARP & P. S. MILLAR.
PHOTOMETER ATTACHMENT.
APPLICATION FILED FEB. 24, 1910.
1,015,515.
Patented Jan. 23, 1912.
4 SHEETS—SHEET 3.
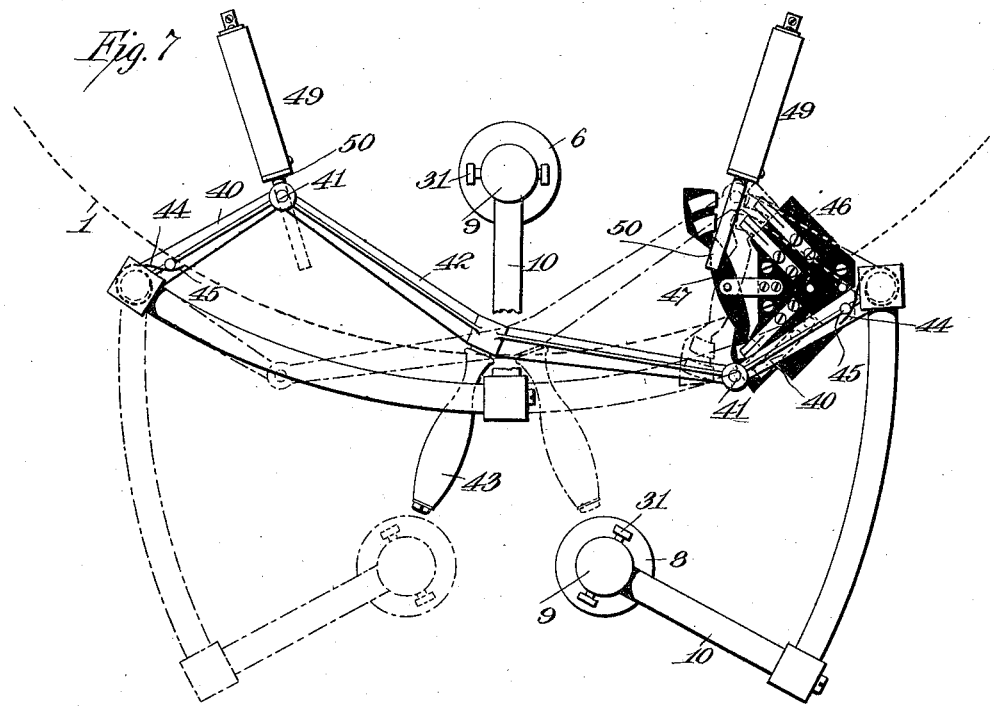
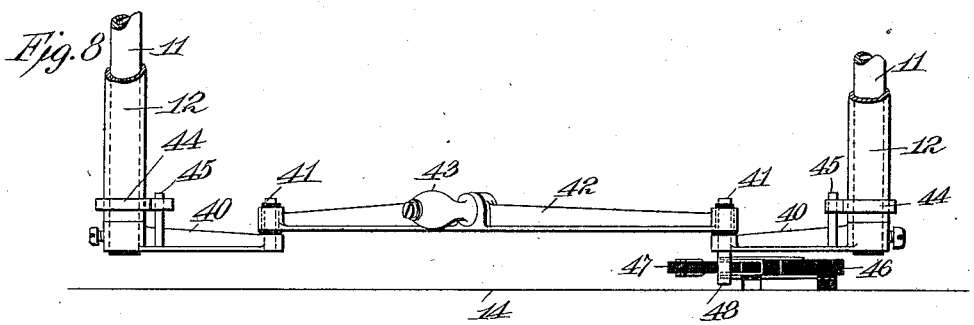
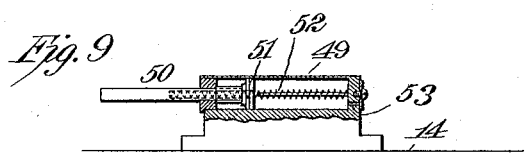
Witnesses:
Jas. F. Coleman
John P. Hotch.
Inventors
Clayton H. Sharp
Preston S. Millar
by Dyn. Dyn & Taylor
Attorneys.

C. H. SHARP & P. S. MILLAR.
PHOTOMETER ATTACHMENT.
APPLICATION FILED FEB. 24, 1910.
1,015,515.
Patented Jan. 23, 1912.
4 SHEETS—SHEET 4.
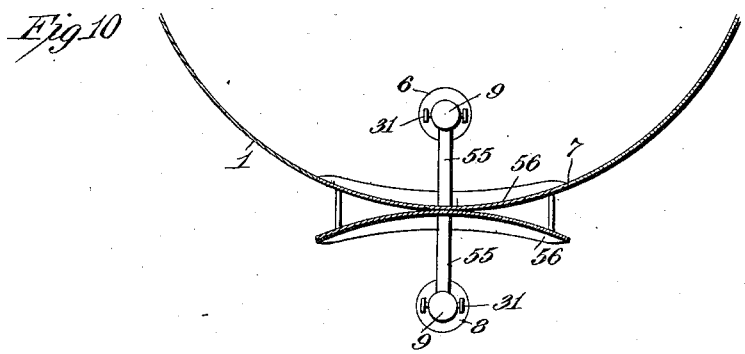
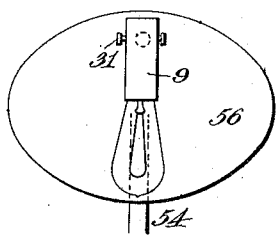
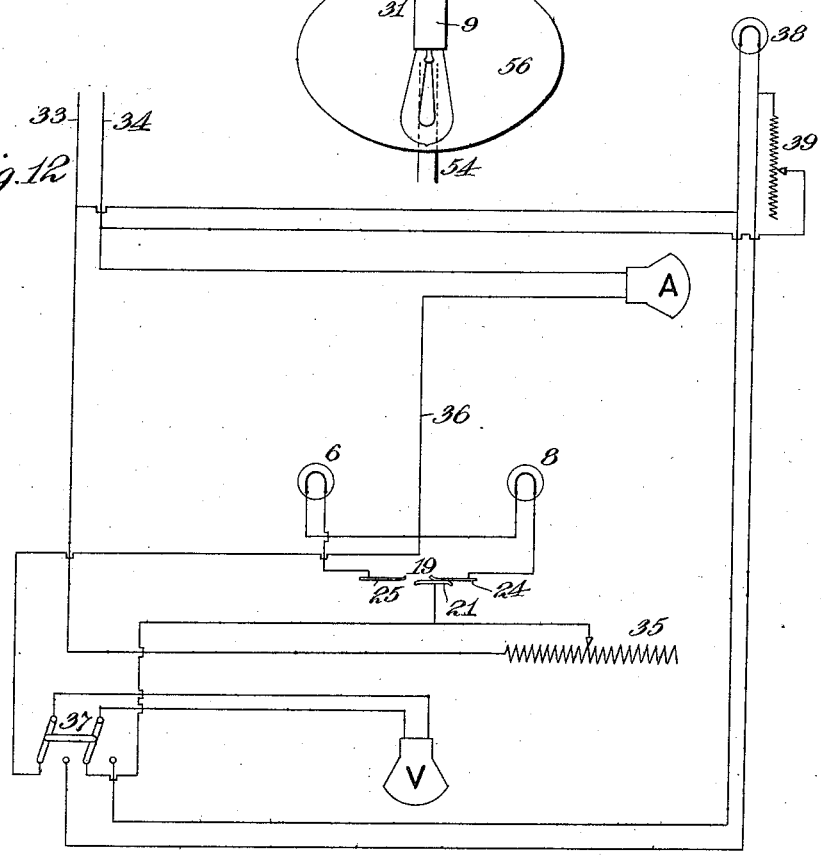
Witnesses:
Inventors
Clayton H. Sharp
Preston S. Millar
By Wm. Wm. Taylor
Attorneys.

UNITED STATES PATENT OFFICE.

CLAYTON H. SHARP, OF WHITE PLAINS, AND PRESTON S. MILLAR, OF NEW YORK, N. Y.

PHOTOMETER ATTACHMENT.

1,015,515.  Specification of Letters Patent.  Patented Jan. 23, 1912.

Application filed February 24, 1910. Serial No. 545,615.

*To all whom it may concern:*

Be it known that we, CLAYTON H. SHARP, a citizen of the United States, and a resident of White Plains, Westchester county, State of New York, and PRESTON S. MILLAR, a citizen of the United States, and a resident of the borough of Brooklyn, county of Kings, city and State of New York, have invented a certain new and useful Photometer Attachment, of which the following is a specification.

This invention relates more particularly to photometers for testing the candle-power of electric lamps.

Certain features of the invention may be applied to various forms of photometers as the spherical photometer or the so-called daylight photometer in which the lamp being measured is inclosed within a light-tight box.

The particular objects we have in view are to increase the speed of operation so that a greater number of lamps may be observed in a given time than heretofore and to assure the safe handling of fragile lamps.

Other objects are to provide means for automatically connecting the lamps under observation in circuit and for preventing accidental interruption of the circuit.

These and further objects will more fully appear from the following specification and accompanying drawings, considered together or separately.

In the drawings: Figure 1 is a plan view of the operative portions of a spherical photometer embodying one form of our invention; Fig. 2 is a sectional view of a suitable form of connection for supporting the lamp under observation; Fig. 3 is a front elevation of the apparatus shown in Fig. 1; Fig. 4 is a detail showing the lamp supporting means and the circuit controlling devices used in connection therewith; Figs. 5 and 6 are details of the circuit controlling devices; Fig. 7 is a plan view of a modified form of lamp supporting mechanism; Fig. 8 is a front elevation of certain parts of the same; Fig. 9 is a detail view of a cushioning device used in connection with the same; Fig. 10 is a plan view of a third modification of the invention; Fig. 11 is a front elevation of a portion thereof; and Fig. 12 is a diagram of the circuits used in connection with the apparatus illustrated in Figs. 1 and 3.

In all views like parts are designated by the same reference numerals.

According to our invention, supports are provided for a plurality of lamps,—preferably two. These lamps are adapted to be alternately introduced within the inclosure, such as the sphere of a spherical photometer or a box of a daylight photometer, and the candle power of the same observed by means of the photometer. While one lamp is within the inclosure and its candle power is under observation, the operator who attaches the lamps to the supports will be attaching a second lamp outside of the inclosure and when the lamp under observation has been observed it will be removed from the inclosure and the second lamp introduced. Then the first lamp is detached from the support and the third lamp introduced, the operation being kept up continuously.

In Fig. 1 the inclosure which is in the form of a sphere is indicated by 1; 2 is the photometer having an eye-piece 3 and window 4; 5, shown in dotted lines, is a shield or screen which is interposed between the window 4 and the lamp 6 when the latter is in proper position within the sphere. The lamps are introduced through an opening 7 (shown in dotted lines in Fig. 3) and are supported within the sphere at the proper point. It is to be understood that when the invention is used in connection with a daylight photometer, the lamp will be introduced into or removed from the box in the same manner.

In the embodiment chosen for illustration in Figs. 1, 3, 4, 5 and 6, two lamps 6 and 8 are each supported upon a structure which permits them to be swung through the opening 7 into the sphere or out again into position, when the operator can take out the lamp and introduce another one within the sphere. The supporting means for the two lamps is identical except they are arranged upon opposite sides of the opening 7. The supporting means is as follows: Each lamp is attached to a socket 9 which in turn is supported on an arm 10. The arm 10 is supported to turn upon a vertical axis so it can swing in and out and pass the lamp into or out of the opening 7. The support for the arm illustrated in Figs. 1 and 3 comprises a vertical rod 11 which is mounted within a sleeve 12, supported upon a tripod 13, which in turn is supported upon a base 14, upon which the entire apparatus rests. The sleeve 12 does not come down quite to the base 14, the space a short distance above the same allowing a sector arm 15 to be secured to the bottom of the vertical rod 11 and turn with the same. Both the sector arm 15 and arm 10 may be secured to the rod by set screws, as shown. From the above description it is apparent that the arm 10 may be swung toward or away from the sphere, passing the lamp into or out of the opening 7. It is also apparent that if the arm 10 swings in or out the sector arm 15 will be moved correspondingly. This sector arm is for the purpose of producing a lock to prevent the lamp which is outside from being introduced into the sphere before the lamp inside the sphere is taken out, and thereby prevents the two arms 10, 10 and the two lamps from coming into collision. It also actuates a switch for connecting up the lamp which is in the sphere. This device is arranged to operate automatically. The structure is best illustrated in Fig. 4. It will be seen that the outer face of the sector arm 15 is provided with a notch 16. The outer face of the sector arm and the notch 16 are engaged by a bar or rod 17 which is mounted in bearings 18, 18, so it will have a limited movement from side to side; in other words toward or from each of the sector arms 15. The ends of the bar are wedge shaped, as shown, so that each end of the bar can enter the appropriate notch 16 on one of the sector arms 15. As shown in Fig. 4 the right hand end of the bar is in engagement with the notch in the right hand sector arm, which latter is in the position which it assumes when the lamp on that side is on the outside of the sphere. The other end of the bar engages with the unnotched portion of the sector arm, which it does when the arm to the left side is in any other position except the extreme outermost position. The arm to the right side of the sphere it is apparent cannot be moved into it until the arm on the left side has been moved entirely out. The arm on the right side can then be moved, the wedge shaped end of the bar engaging with the notch to move the bar toward the left to the dotted line position and into the notch on the sector arm to the left, which sector arm will be in a position to permit this to be done at that time. This device produces a lock by means of which the lamp which is on the outside cannot be moved into the sphere until the lamp on the inside has been fully moved out. The device also combines with it a circuit changer by means of which the lamp on the inside of the sphere will be automatically connected in circuit. This structure is best illustrated in Figs. 4, 5 and 6. It comprises a movable contact element 19 which in the embodiment chosen for illustration is carried by the rod or bar 17 and is insulated therefrom. This movable contact element 19 comprises a block 20 of insulating material, a top plate 21 of conducting material and a bottom plate 22 of conducting material. The insulating block 20 is shown as supported upon the bar 17 and connected thereto. It is apparent that the two plates 21 and 22 are insulated from the bar and from each other. The two plates 21, 22 are connected to the main circuit by flexible conductors. With these portions of the device is combined a block 23 of insulating material supported upon the base 14 and having an opening in the center in which the block 20 with its plates 21 and 22 may move. On this block 23 are top plates 24 and 25 of conducting material and bottom plates 26 and 27, also of conducting material. These plates are elastic and are so arranged that their free ends which extend into the opening in the center of the block 23 will closely engage with the top and bottom plates 21 and 22, when the moving element is moved from one side to the other by movement of the bar 17. It is to be noted that the width of the top and bottom plates 21 and 22 is greater than the gap between the top and bottom plates 24, 25 and 26, 27, as is shown in Figs. 4 and 5. It is therefore apparent that the plates 21 and 22 are always in contact with one or both of these plates. Therefore the circuit, which will be described, is never broken and the voltmeter therefore is not subject to shocks which might cause its needle to violently vibrate.

For the purpose of closing the opening 7 in the sphere, each of the arms 10, 10 is provided with a shield 28 which may be slightly larger than the opening and so supported upon the arm that when the latter is in the innermost position and the lamp in the position assumed when under observation, the opening will be entirely closed.

Any form of socket may be used for supporting the lamp,—that illustrated in Fig. 2, which forms no part of our present invention, being a satisfactory form. In Fig. 2 the lamp is supported upon arms 29, 29 having serrated lower extremities which engage with a thread on the base of the lamp and having their upper extremities separated by a spring 30. Finger pieces 31, 31 project on opposite sides. These finger pieces may be pressed together, separating the lower extremities of the arms 29 and releasing the lamp. The center terminal of the lamp connects with a pin 32 which is insulated from the rest of the socket and is free to move up and down in order to accommodate itself to lamps of different sizes. This pin 32 is connected by a flexible conductor to the rest of the circuit.

Before describing other embodiments of our invention, we direct attention to Fig. 12, which shows one form of arrangement for the circuits for the purpose already described. In Fig. 12 the moving contact element 19 is conventionally shown, only the plates 21, 24 and 25 being illustrated. The plates 22, 26 and 27 are grounded to the arms of the instrument. The lamp 6 is electrically connected to the plate 25, and the lamp 8 to the plate 24. In the figure, 33 and 34 are the connections to the mains. The circuit, as illustrated, is first through the wire 33 to the adjustable resistance 35, the plate 21 of the movable contact element 19 to the lamp 8 through the wire 36 to the ammeter indicated by "A" and thence to the line through the main 34. The voltmeter indicated by "V", it is apparent, is in parallel or in shunt with the lamp through the poles of a switch 37. When the moving contact element is moved to bring the plate 21 in engagement with the plate 25 it is apparent that the lamp 8 will be cut out and the lamp 6 cut in. As however there will be no interruption of current, owing to the fact that the plate 21 is longer than the gap between the plates 24 and 25, the voltmeter will always be in circuit and there will be no violent movement of its needle, as would be the case if the current became broken. The adjustable resistance 35 is for the purpose of allowing the operator who is adjusting the lamps in position to bring the current in the lamp under observation up to the proper voltage. The switch 37 may be moved so that its poles will connect a circuit which includes the photometer lamp 38 in shunt so that the voltage of that lamp may be observed. The photometer lamp is connected with mains 33, 34, as shown, through an adjustable resistance 39.

In the modification of the invention illustrated in Figs. 7, 8 and 9, an arrangement is provided by means of which the lamp can be moved into and out of the sphere by a single movement. This movement increases the speed of the apparatus. The lamps are supported in the same manner as described, except that the lower ends of the rods 11, 11 are connected to different mechanism from that already described. In place of the sector arms 15 are levers 40. On the inner end of each lever is a vertical pin 41, which is connected to a floating lever 42. At the center of this floating lever and projecting at right angles therefrom is a handle 43. The levers 40 and floating lever constitute a variety of toggle movement. By moving the handle 43 from the position shown in solid lines to the position shown in dotted lines, as illustrated in Fig. 7, the lamp 6 will be moved out of the sphere to the dotted line position and the lamp 8 will be moved into the sphere to the position occupied by the lamp 6. The lamp which is within the sphere must first be moved out before the lamp which is outside can come in, and this will be automatically done by the movement of the handle. The lamp which is outside is assisted in its inward movement by means of springs 44, one of which is attached to each lever 40 and engages with a pin 45 thereon. The movable circuit controlling element in this modification is somewhat different than that described in the embodiment of the invention already described. The element comprises a switch which consists of a base 46 formed of insulating material, which is attached to the base 14 and insulated therefrom. To the base 46 are attached contact elements, as shown, formed of conducting material and also a pivoted element or bar 47 formed of insulating material and carrying contact elements, as shown. The outer face of this bar is so shaped as to give a cam effect, as illustrated in Fig. 7, and is adapted to be engaged by a pin 48, depending from the lever 40 immediately above it. This pin 48 may be a continuation of the pin 41 carried by such lever and already described. It is apparent that the contact device functions like that one already described in connection with the structure illustrated in Fig. 4. The gap between the moving and contact elements is less than the width of the contact surfaces so that the circuit is never broken when current is transferred from one lamp to the other.

In connection with the apparatus just described it is desirable to provide a shock absorbing device, as the springs 44 suddenly swing the lamp supporting mechanism into the sphere with some force. The device illustrated in detail in Fig. 9 may be employed for this purpose. This device consists, for each lamp supporting element, of a cylinder 49 supported upon the base 14 and carrying a piston rod 50, which is adapted to lie in the path of the lever 40. Within the cylinder is a piston 51 and a spring 52 for forcing the piston rod out. A vent 53 closed by an adjustable valve, as shown, is used to prevent too rapid escape of air from the cylinder.

A third embodiment of our invention is illustrated in Figs. 10 and 11, in which the two lamps illustrated are mounted upon a vertical shaft 54 which lies in line within the center of the opening 7 of the sphere. The lamps 6 and 8 are supported upon brackets 55, 55 of such a length that the lamp under observation will be in the proper position within the sphere. By turning the shaft 54 one lamp may be brought out of the position within the sphere and the other into it. The shields 56 are carried by the shaft 54 and are of such a shape that they will entirely close the opening 7 when a lamp is in place. The moving contact element in this embodiment of the invention will be carried by the shaft 54 and will be so arranged that the lamp within the sphere will be in circuit. Any well known form of electric cut out can be used for this purpose.

In accordance with the provisions of the patent statutes, we have described the principle of our invention, together with the apparatus which we now consider to represent the best embodiment thereof, but we desire to have it understood that the apparatus shown is merely illustrative and that the invention can be carried out in other ways.

Having now described our invention, what we claim as new and desire to secure by Letters Patent, is:—

1. A photometer having an inclosure, and a plurality of independent lamp supporting means which move through a wall of the inclosure, and means to prevent more than one lamp at a time from being introduced into the inclosure.

2. A photometer having an inclosure, and a plurality of independent lamp supporting means which move through a wall of the inclosure, and means to lock the lamp supporting means which is outside the inclosure against introduction into the inclosure when the other lamp supporting means is within the inclosure.

3. A photometer having an inclosure, in combination with two lamp supporting arms swinging through a wall of the inclosure, and means to lock the arm which is outside the inclosure against movement when the other arm is within the inclosure.

4. A photometer having an inclosure with a single lamp introducing opening therein and a plurality of lamp supporting means, and means to move the lamp supporting means successively into the opening.

5. A photometer, having an inclosure with a single lamp introducing opening, in combination with a plurality of supporting arms, lamps carried by the arms, and means to successively swing the lamps into the opening.

6. A photometer which comprises an inclosure with a single lamp opening therein, in combination with a plurality of lamp supports, means to successively introduce lamps into the opening and means to close the opening when a lamp is within the inclosure.

7. In a photometer, an electric circuit and an inclosure, in combination with a plurality of lamp supports, means for successively introducing the lamps into the inclosure and means for connecting the lamps with the circuit, such means connecting the lamp within the inclosure in circuit.

8. In a photometer, an electric circuit and an inclosure, in combination with a plurality of lamp supports, means for successively introducing the lamps into the inclosure and means for connecting the lamps with the circuit, such means connecting the lamp within the inclosure in circuit and also breaking the circuit on the withdrawal of the lamp from the inclosure.

9. In a photometer, the combination with an inclosure, a plurality of lamp supporting means adapted to successively carry the lamps into the inclosure, a lock to prevent introduction of more than one lamp at a time, and a switch actuated by the lock to connect the lamp in the inclosure in circuit and disconnecting the lamp when withdrawn from the inclosure.

10. In a photometer, the combination with an inclosure, two lamp supporting arms, supports for the arms, connections between the two arms, manual means for moving the connections, and a switch actuated by the movement of an arm, said switch controlling current to the lamps.

11. In a photometer, the combination with an inclosure, lamp supporting means which comprise two lamp supporting arms journaled upon bearings, levers connected to the arms and a floating lever connecting the said levers and a handle upon the floating lever, elastic means exerting a stress upon the arms to throw them within the inclosure and an elastic buffer in the path of the lamp supporting means to resist shock.

12. In a photometer, an inclosure, two lamp supporting arms, a shaft supporting each of the arms, a lever on each shaft, a floating lever connecting the two levers, a handle upon the floating lever, in combination with a circuit controller which comprises a moving element and a fixed element, and connections between the moving element and one of the levers.

13. In a photometer, the combination with a plurality of lamp supporting means, an electric circuit and a voltmeter, of means for moving the lamps and means for shifting the circuit from one lamp to the other, the said shifting circuit means operating to prevent the circuit from being broken when the lamps are moved.

This specification signed and witnessed this 28th day of January, 1910.

CLAYTON H. SHARP.
PRESTON S. MILLAR.

Witnesses:
F. M. FARMER,
WM. W. CRAWFORD.

Copies of this patent may be obtained for five cents each, by addressing the "Commissioner of Patents, Washington, D. C."